United States Patent [19]
Beach et al.

[11] 3,724,608
[45] Apr. 3, 1973

[54] DRAFT DEVICE
[75] Inventors: John M. Beach, 116 Davis Avenue; Melvin A. Brown, both of Dayton, Ohio
[73] Assignee: said Beach, by said Brown
[22] Filed: Mar. 24, 1971
[21] Appl. No.: 127,603

[52] U.S. Cl. ............................................. 188/112
[51] Int. Cl. ............................................. B60t 7/20
[58] Field of Search ........................... 188/112, 142

[56] References Cited

UNITED STATES PATENTS

| | | | |
|---|---|---|---|
| 2,101,600 | 12/1937 | Sandul | 188/112 |
| 2,149,188 | 2/1939 | Shaffer | 188/112 |
| 2,571,323 | 10/1951 | Yoder | 188/112 |
| 3,404,757 | 10/1968 | Beach et al. | 188/112 |
| 3,505,815 | 4/1970 | Wherry | 188/112 X |

FOREIGN PATENTS OR APPLICATIONS

| | | | |
|---|---|---|---|
| 242,606 | 1/1963 | Australia | 188/112 |

Primary Examiner—Duane A. Reger
Attorney—John A. Young

[57] ABSTRACT

Between a towing vehicle and a towed vehicle is a draft device made up of a draw bar attached to the towing vehicle and a telescoping draw bar attached to the towed vehicle with a lost motion connection between the draw bars. A cylinder is mounted on the one draw bar and a piston-piston rod is attached to the other draw bar with the piston located in the cylinder to provide two variable volume chambers which exhaust fluid from one chamber to the other during relative movement of the draw bars. A metering orifice is formed in the piston and a valve controls the metering orifice so that if the closing movement between the towing vehicle and the towed vehicle is excessive there will be a sharp increase in the fluid pressure within the exhausting chamber which causes the valve to close the metering orifice. Fluid pressure buildup is then communicated to the hydraulically actuated brakes on the towed vehicle to slow the towed vehicle and prevent further closure between the towing vehicle and the towed vehicle.

11 Claims, 8 Drawing Figures

PATENTED APR 3 1973 3,724,608

INVENTORS
MELVIN A. BROWN
JOHN M. BEACH

BY John A. Young
ATTORNEY

INVENTORS
MELVIN A. BROWN
JOHN M. BEACH

BY John A. Young
ATTORNEY

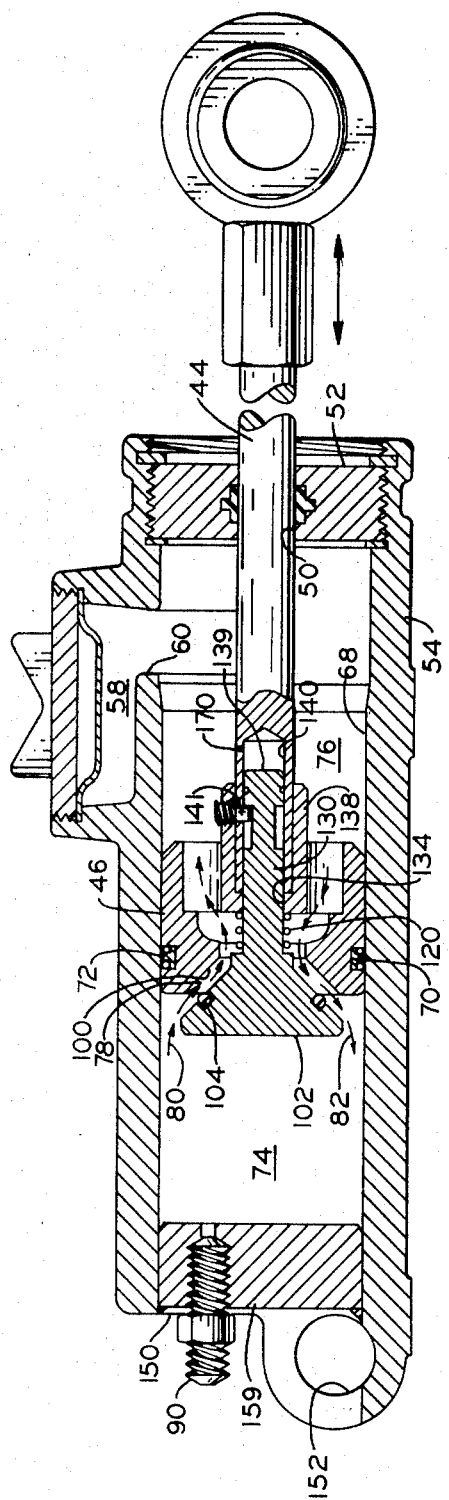
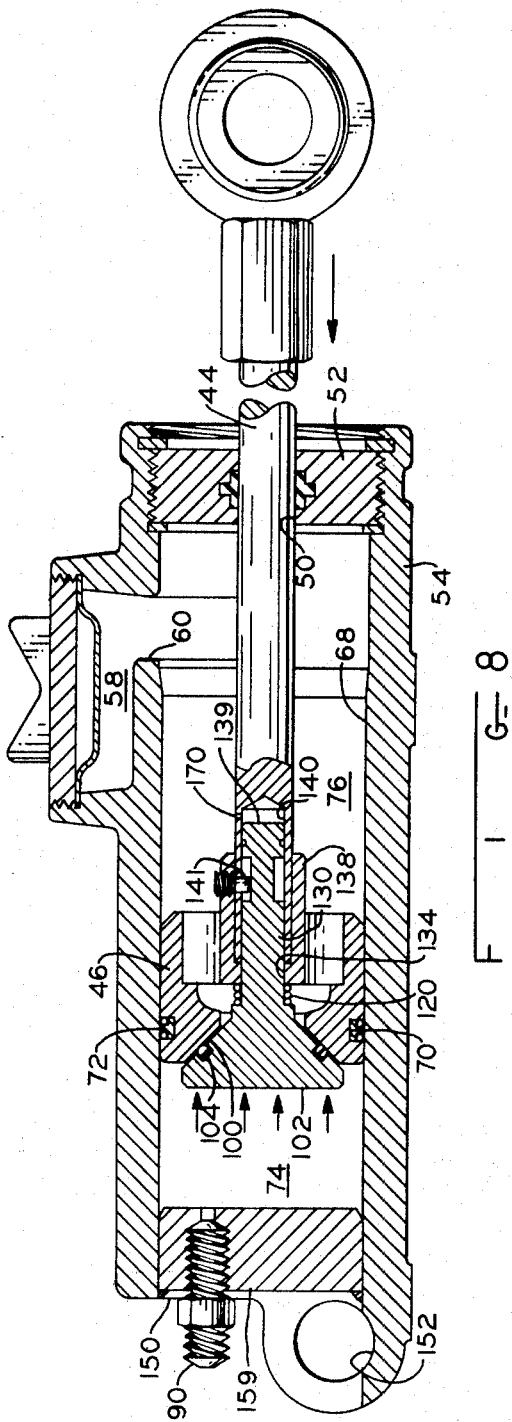
INVENTORS
MELVIN A. BROWN
JOHN M. BEACH
BY John A. Young
ATTORNEY

DRAFT DEVICE

BACKGROUND OF THE INVENTION

Many draft instruments have been proposed to control the rate of closure between a towing vehicle and a towed vehicle. Many of these draft linkages are in the nature of inertia controls which are responsive to the rate of closure between the vehicles and serve to control brakes in the towed vehicle. In the present invention, unlike previous inventions, we propose a simple yet effective combination of draft bars, one of which is associated with the towing vehicle and the other associated with the towed vehicle which are relatively movable through a lost motion connection therebetween. Mounted directly on the draft linkage is a hydraulic device which is responsive to the rate of closure between the towing vehicle and the towed vehicle. Specifically, when a vehicle is traveling downhill with an unequalized retarding force on the wheels of the towing and towed vehicle this will be sensed by the hydraulic device, as a closing between the two vehicles at the draft linkage. Similarly when the vehicle is moving on level ground should there be a stoppage force at the towing vehicle substantially greater than that on the towed vehicle the hydraulic device will similarly sense excessive rate of closure. When the draft device is in an extending direction, for example when the vehicle is traveling uphill or when the two vehicles are moving in tandem at substantially the same rate of acceleration or deceleration, then the sensing instrument is non-operative.

OBJECTS OF THE INVENTION

The foremost object of the present invention is to provide a simple and effective hydraulic device which is combined with a draft linkage between a towing vehicle and a towed vehicle in order to control the rate of closure therebetween and to improve the drivability of the combination.

Another object of the present invention is to provide a novel hydraulic device which is combined with a draft apparatus which forms the tow linkage between a towing vehicle and a towed vehicle and wherein the hydraulic device automatically senses the rate of closure between the towing vehicle and the towed vehicle, and limits the rate of closing movement therebetween.

It is a still further object of the present invention to provide a simple, quick-responsive valve within a hydraulic device which can respond rapidly and efficiently to changes in draft forces between the towing vehicle and the towed vehicle and will contribute greatly to the controllability and safety of vehicle operation.

Other objects and features of the present invention will become apparent from a consideration of the following description which proceeds with reference to the accompanying drawings.

DRAWINGS

Figure 6:
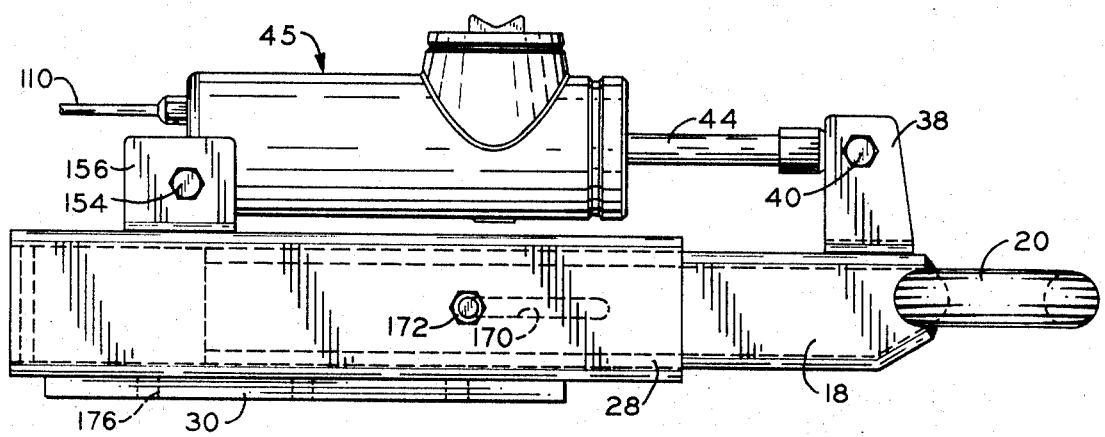
FIG. 6 is a side elevation view of the draft linkage and hydraulic control.
Figure 5:
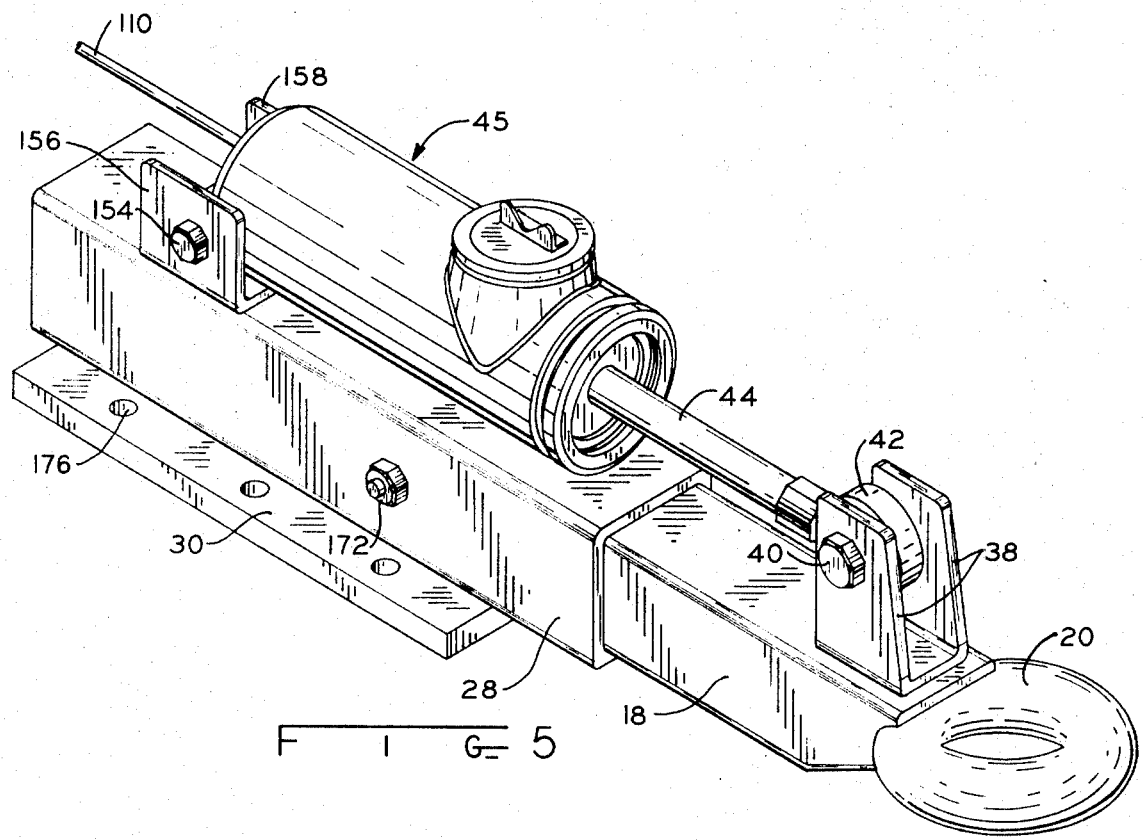
FIG. 5 is an isometric detail view of the draft linkage and associated hydraulic control mechanism.

FIG. 7 is a sectional view of the hydraulic device illustrated in FIG. 6, illustrating the metering valve open and metering fluid either to the right or to the left, depending upon extension or contraction of the draft linkage; and FIG. 8 illustrates a condition wherein the closing rate of movement between the drawing and drawn vehicles is excessive and the metering valve is closed to effect braking of the wheels on the towed vehicle.

DETAILED DESCRIPTION OF THE INVENTION

Figure 1:
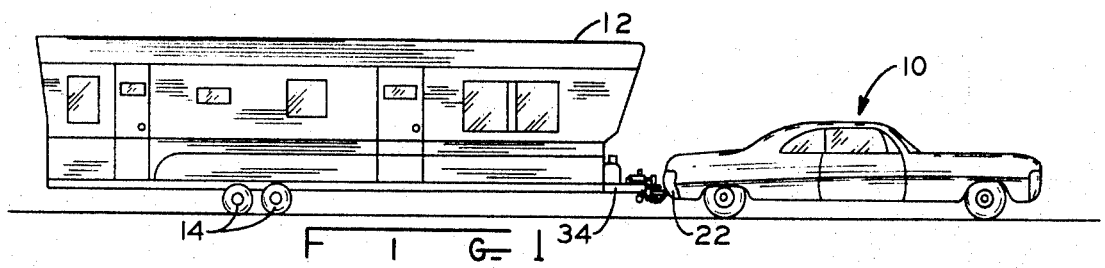
FIG. 1 illustrates a combination towing vehicle and trailer which is being drawn on level terrain by a draft linkage of the present invention.
Figure 2:
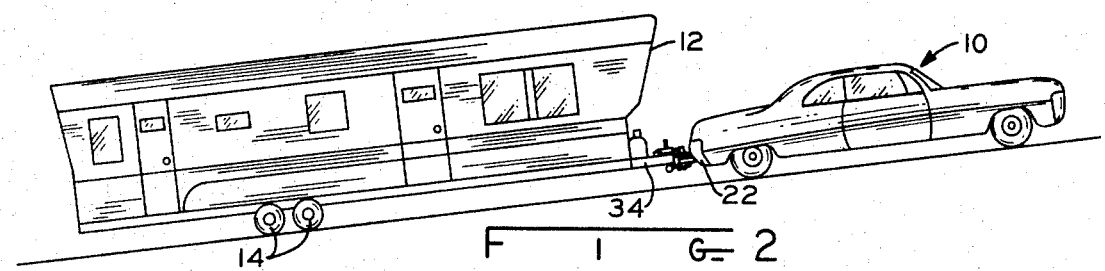
FIG. 2 illustrates the same combination of FIG. 1, with the tandem moving uphill and imposing one class of draft forces on the draft linkage.
Figure 3:
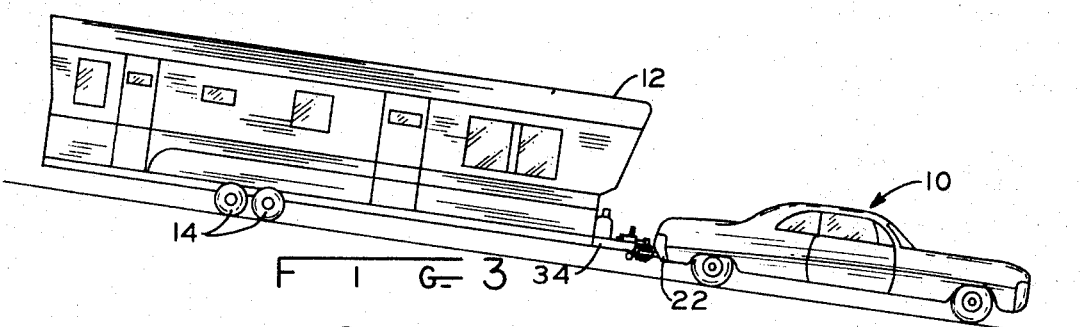
FIG. 3 illustrates the same tandem of FIGS. 1 and 2, but going downhill.

Referring to FIGS. 1-3, the towing vehicle designated generally by reference numeral 10 may consist of a passenger car vehicle and the towed vehicle may consist of a recreational housing vehicle 12, which is mounted on ground engaging wheels 14. Between the towing automobile 10 and the towed vehicle 12 is a draft linkage 16 consisting of a tow (or draw) bar 18 having an eye 20 connected through a clevis or the like to the bumper 22. A second draft or tow bar 28 is connected by a flange 30 to a tongue 34 of towed vehicle 12. The tow bar 18 has a pair of upright flanges 38 and a journal pin 40 is passed through aligned openings in the flanges 38 and a companion opening in circular boss 42 at the end of piston rod 44. Piston rod 44 carries a piston 46 on the end thereof (FIGS. 7,8), said piston rod 44 also passing through an opening 50 of a wall 52 which seals one end of cylinder housing 54. Cylinder housing 54 has an integrally formed surmounting hydraulic reservoir 58 and access opening 60, or port which communicates with the cylinder bore 68 to keep the cylinder bore replenished with fluid.

Piston 46 has a groove 70 and an O-ring 72 therein, and 46 divides the interior cylinder bore into two variable volume chambers 74 and 76 so that as the piston moves back and forth, fluid is passed from the exhausting chamber into the enlarging chamber through a metering orifice 78 either in the direction indicated by the arrows 80 or the arrows 82, depending upon the direction of travel of the piston. Thus, when the piston is moving to the left, fluid is passed from exhausting chamber 74 in the direction of the arrows 80 into the enlarging chamber 76. When the piston is moving to the right (FIG. 7), fluid is passed from the exhausting chamber 76 into the enlarging chamber 74 in the direction of the arrows 82.

Figure 4:
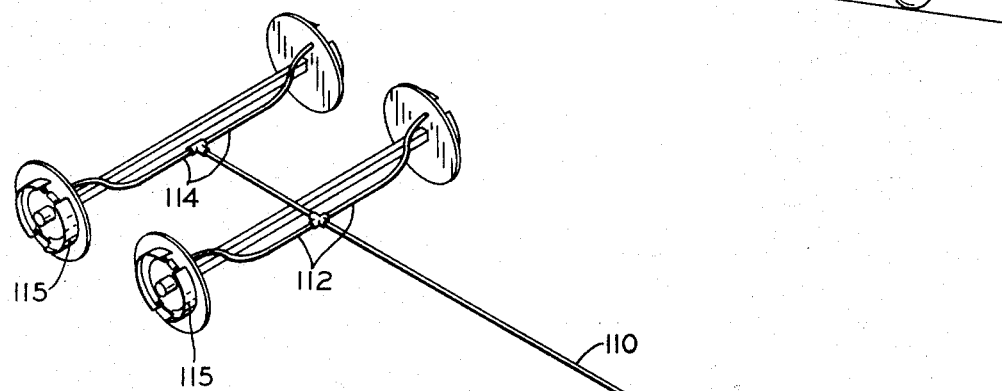
FIG. 4 illustrates in isometric detail the hydraulic connection between the hydraulic device mounted on the draft linkage and the hydraulically operable brakes combined with the wheels of the towed vehicle.

The metering orifice 78 is defined by a frusto-conically shaped opening which is formed centrally in the piston, and includes a valve seat 100 and a control valve 102 which is also frusto-conically shaped to bear against the valve seat either throttling flow indicated by arrows 80 or terminating it entirely, depending upon the relative position of the valve 102 relative to the seat 100. It should be noted that the frusto-conically shaped valve 102 contains an O-ring 104 and once it is seated, fluid is prevented from moving in the direction of the arrows 80 and thus the piston 46 is precluded from moving any further to the left (FIG. 8) except insofar as fluid can be displaced through line 110 (FIG. 4) and branch lines 112, 114 to effect expansion and actuation of foundation brakes 115 associated with the vehicle wheels 14 and effect braking of the wheels 14.

The valve 102 is biased in a normally open position indicated in FIG. 7 by means of a spring 120 which surrounds valve stem 130 which is slidably supported within an opening 134 provided by sleeve 138 and land 139 disposed within a centrally drilled opening 140 in the piston rod 44. As shown in FIG. 7, the spring 120 biases the stem 130 and valve 102 to the left until land 139 engages a stop 141 threadedly received in sleeve 138. The control valve 102 is supported by a combination of the piston rod and piston as shown in FIG. 7 and moves therewith.

The piston rod is constrained to slidable rectilinear movement by passing through opening 50 in end wall 52.

As shown in FIGS. 7 and 8 the end 150 of the cylinder housing 54 has an eyelet 152 which is mounted on a bolt 154 passing through openings in flanges 156, 158 and permitting the cylinder to move angularly thereon.

End 150 of the cylinder bore 68 is sealed by a fluid-impervious wall or plug 159 in a hydraulic fitting 90 in wall 159 is used to form a fluid connection with line 110. Viewing FIGS. 6 and 7, the draft connection between the towing vehicle and the towed vehicle provides for drag force between tow bar 18 and tow bar 28, and the limits of relative movement therebetween are provided by lost motion connection consisting of an elongated track or opening 170, associated with tow bar 18 and a bolt 172 which is held by the relatively stationary tow bar 28. Bolt 172 bottoms against one or the other of opposite ends of the slot to define the maximum relative movement between the two tow bars. The tow bar 28 has mounting flanges 30 with mounting openings 176 which can be bolted to the tongue of the towed vehicle.

OPERATION

In operation, the towing vehicle 10 either when going downgrade (FIG. 3) or when braking, in any of the attitudes of FIGS. 1, 2, or 3, there will be a tendency for the towed vehicle 12 to override the towing vehicle and its inertial force can disrupt and cause the driver to lose control of the towing car. The draft linkage should always be under tension for ideal conditions. The draft linkage is maintained under tension at all times by means of a hydraulic device 45 mounted thereon, and the results are accomplished by selectively applying the brakes at foundation wheels 14 whenever there is a tendency of the towed vehicle 12 to override the automobile 10. Draft force is communicated between the automobile and the towed vehicle by means of draft linkage 16. The tow bar 18 attached to the automobile will move with the automobile through the lost motion connection until bolt 172 bottoms at the end of track 170, and pulling force is then communicated to tow bar 28 attached to tongue 34 of the towed vehicle 12. Should the brakes be applied on the automobile, and there is no impedence on the towed vehicle 12, the towed vehicle 12 will move forwardly by its own inertia and impose a pushing force on the rear end of the vehicle and produce a condition of instability of steering and control of the car 10; this is an undesirable result. Such overriding is prevented in the present invention by means of the hydraulic device designated generally by reference numeral 45 which surmounts the draft linkage.

The draft linkage is shown in its maximum extension position shown in FIG. 6, and in the event of excessive forward movement of the towed vehicle 12, the tow bar 28 will tend to move towards the right relatively to the tow bar 18, and in doing so, will carry the attached cylinder housing forwardly with it. If this forward movement is slow or unexcessive, the chamber 74 will exhaust fluid at a rate which is within the limitations of the metering orifice, and the fluid pressure within chamber 74 will not be excessive; hence, pressure within the exhausting chamber 74 will not significantly communicate brake-applying force through line 110 and branch lines 112, 114 to the brakes 115, and retard the forward movement of the vehicle 12. In the event, however, that overriding inertia of towed vehicle 12 is excessive, hydraulic pressure within 74 will rise appreciably, causing valve 102 to move toward the right against the resistance of spring 120, causing the valve 102 to become seated against a frusto-conical seat as shown in FIG. 8. Note should be taken that land formed at the end of the stem 130 can exhaust fluid within the bore through breather port 170 (FIG. 8). Once the metering orifice is closed (or throttled) the pressure will build up even further, and such buildup of pressure will communicate itself through line 110 connecting with chamber 74 and branch lines 112, 114, to hydraulically apply the foundation brakes 115, and retarding the forward movement of the trailer 12 until the tow 10 moves the draw bar 18 to the right relatively to the draw bar 28, relieving the pressure in 74 thereby releasing the foundation brakes 114 and allowing the valve 102 to open. The relative movement of bar 18 relatively to 28 continues until lost motion connection prevents such further relative movement by bottoming of the bolt within the slot 170. The lost motion connection is accompanied by travel of the piston 46 and piston rod 44 toward the right (compare the position shown in FIG. 8 to that of FIG. 7) and during that time the chamber 76 exhausts fluid to chamber 74 as indicated by the arrows 82 at the bottom part of FIG. 7. This condition of FIG. 7 sustains so long as the vehicle 10 maintains an extending force on the draft linkage, or at least a neutral force on the draft linkage.

During all conditions, the hydraulic device acts as a continuous monitoring means which in effect serves to effect brake applying force on the foundation wheels of the towed vehicle 12, whenever the momentum of vehicle 12 is greater than the momentum of the towing vehicle 10, at which time, the draft linkage is under compression, and this is accomplished by trapping fluid within chamber 74 and prevent its metering across piston 46. Such fluid pressure trapped within 74 is utilized to effect brake-applying force through lines 110, 112, 114. It should be further noted that the degree of applying force exerted at the foundation wheels 14 is directly proportional to the overriding force exerted by the vehicle 12 relative to vehicle 10 so that an equalized inertia force between 10 and 12 is at all times maintained by the hydraulic monitoring device.

The response time of the device is very rapid by which the hydraulic device attempts to equalize the momentum or inertia force between the two vehicles; but the device will avoid "hunting."

Whenever the vehicle 10 has a momentum exceeding that of 12, the draft linkage will extend and is under tension.

Such is permitted freely by exhausting fluid from chamber 76 to 74 which occurs by extending movement of the draw bars from the position of FIG. 8 to the position shown in FIG. 7. It is only when the hydraulic cylinder moves beyond the piston, by reason of having a greater momentum that fluid will exhaust from chamber 74 to 76 in the direction of the arrows 80 (FIG. 7) that pressure in 74 builds up sufficiently to close the valve 102 and apply the brakes 14 by communicating the fluid pressure from 74 to the brakes until such time as the momentums are equalized between 10 and 12. Valve 102 will then open, pressure will be relieved on the brakes, and the draft linkage will again extend to its normal position in FIG. 6.

The described action takes place spontaneously and automatically without conscious effort on the part of the operator, thus equalizing at all times the momentum of the car 10 and vehicle 12 by utilizing braking action at the wheels 14, thus contributing to the controllability and safety of operation of the automobile 10 by avoiding the dangerous instability of an overriding towed vehicle.

The hydraulic device is relatively simple to produce and maintain, and fluid can be replenished from time to time easily by simply adding fluid to the hydraulic reservoir at the mouth 58. It is also easy to check whether or not the unit is adequately supplied by visually inspecting the hydraulic reservoir.

Although the present invention has been described in connection with a selected example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. A hydraulic control device linkage disposed between a towing vehicle and a towed vehicle comprising a relatively movable draft bar secured to the towing vehicle and a complementary draft bar operatively associated with the towed vehicle and including a lost motion connection therebetween providing relative movement during both extension and contraction of said device to define maximum limits of relative movement between the towing vehicle and the towed vehicle, said hydraulic device comprising a cylinder and coacting piston movable within said cylinder within the limits defined by said lost motion connection, and including therein a limited hydraulic fluid access passage which meters the fluid between two variable volume spaces within said cylinder defined by said piston, a spring loaded pressure responsive means controlling the flow of fluid through said access passage and responsive to fluid pressure during contracting movement between said draft bars to effect at any stage of contraction of said device an impeded flow through said limited access passage and thereby snub excessive contraction rate of said device and moving in an opening direction to provide unimpeded fluid flow during extending draft bar movements to enable relative movement between said towing vehicle and towed vehicle within the limits provided by said lost motion connection.

2. The structure in accordance with claim 1 including a hydraulic reservoir having an access port providing fluid transfer to within said cylinder.

3. The structure in accordance with claim 1 including means for defining the open position of the pressure responsive means as fluid is transferred through said piston.

4. The structure in accordance with claim 1 wherein said cylinder and piston are operatively pivotally connected one to each of said respective draw bars whereby closing forces effecting excessive closing movement between the towing vehicle and the towed vehicle, are resisted by a solid column of fluid within the cylinder.

5. The structure in accordance with claim 1 wherein said access passage is formed by an opening through said piston which is slidably mounted within said cylinder, said passage being opened and closed by said coacting pressure responsive means and is formed in said piston.

6. A draft device between a towing vehicle and a towed vehicle which is adapted to control the rate of closing between relatively slidable draft bars secured one to each of said towing vehicle and towed vehicle respectively and having a lost motion connection therebetween defining the limits of relative movement between said towing vehicle and towed vehicle, a cylinder operatively secured to one of said draw bars and a piston-and-piston rod operatively secured to the other of said draft bars and slidably received within said cylinder to define two variable volume hydraulic chambers therein, a metering orifice defined by said piston, and valve means carried by said piston rod and adapted to control said metering orifice, spring means biasing said valve means to an open position to permit unimpeded flow through said metering orifice during extending movement of said piston-and-piston rod within said cylinder, said valve being responsive to fluid pressure within the exhausting chamber during contracting stroke of piston and cylinder as the distance closes between said towing vehicle and towed vehicle to retard closing movement of said draft bars by constricting flow through said orifice responsively to excessive rate of closing movement during the entirety of the relative movement between said towing vehicle and towed vehicle, and means for communicating fluid pressure from said exhausting chamber to effect application of the brakes associated with said towed vehicle.

7. A draft device in accordance with claim 6 wherein said valve means is comprised of a frusto-conically shaped valve head and a coacting valve seat formed in said piston, and a valve stem slidably journaled within a passage provided by the end of said piston rod, and stop means defining the maximum extended movement of said valve means relative to said metering orifice.

8. The draft device in accordance with claim 7 including a barrier closing the end of said cylinder and slidably receiving said piston rod therein.

9. The draft device in accordance with claim 8 including a hydraulic fluid reservoir and a breather port communicating with said cylinder to replenish the fluid therein.

10. The draft device in accordance with claim 9 wherein the lost motion connection provided between said relatively movable draft bars defines the maximum extent of relative movement therebetween in opposite directions and thereby defines the maximum relative movements between said towing vehicle and towed vehicle.

11. The draft device in accordance with claim 10 wherein the respective connections between the draw bars and said cylinder and piston rod respectively are articulated connections.

* * * * *